UNITED STATES PATENT OFFICE.

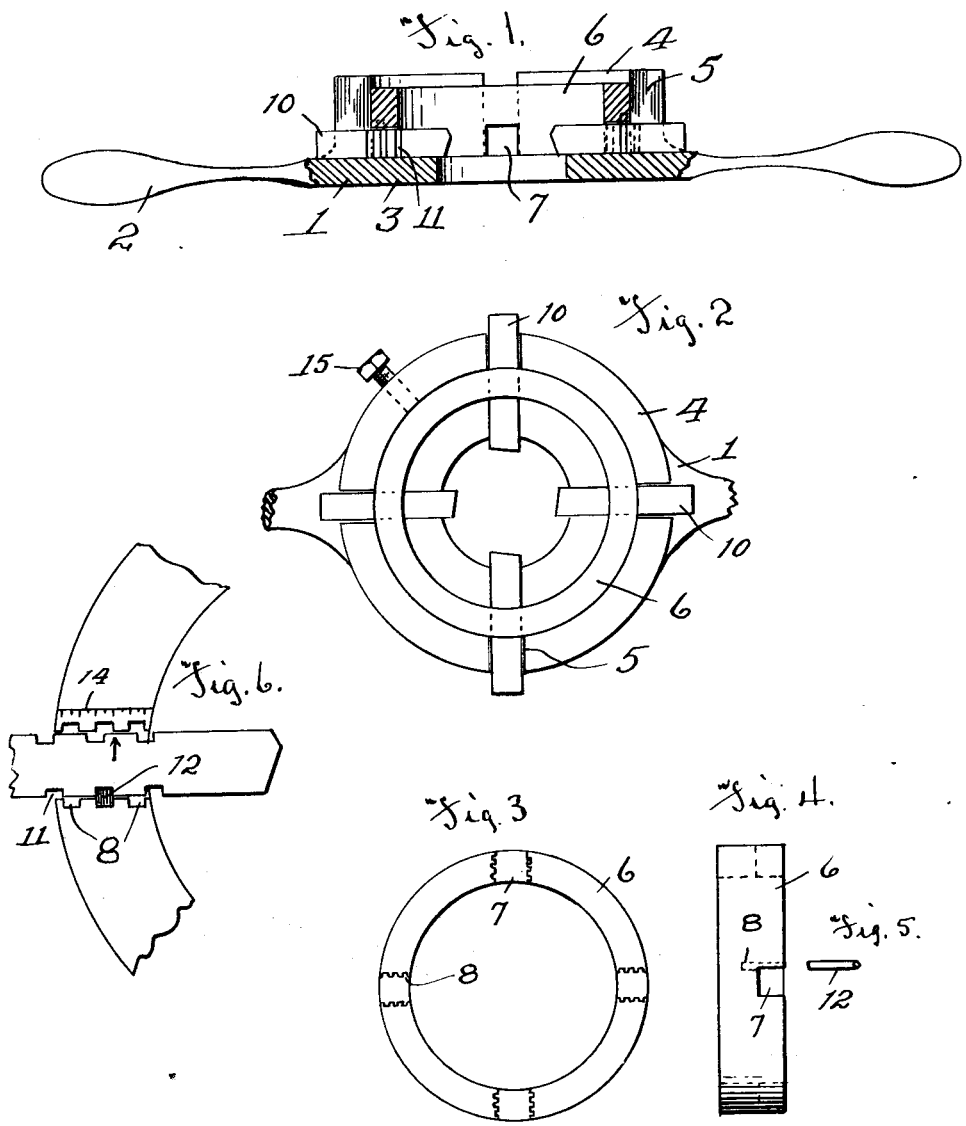

CHARLES B. BICKEL, OF READING, PENNSYLVANIA.

THREADING-TOOL.

1,031,905.  Specification of Letters Patent.  Patented July 9, 1912.

Application filed April 11, 1912. Serial No. 690,119.

*To all whom it may concern:*

Be it known that I, CHARLES B. BICKEL, citizen of the United States, residing at Reading, in the county of Berks and State of Pennsylvania, have invented certain new and useful Improvements in Threading-Tools, of which the following is a specification.

This invention relates to improvements in threading tools and the object is to provide a device, preferably in the form of a hand tool, for threading rods or tubular bodies.

My invention lies in the means for holding the cutters and in the arrangement for setting these cutters so that threads may be cut on bodies of different diameters with the same tool.

The invention consists of a hollow stock together with a circular cutter holder adapted to be placed in the stock after the cutters have been adjusted in the holder.

The invention is more fully described in the following specification and clearly illustrated in the accompanying drawing, in which:—

Figure 1 is a central longitudinal section of my tool. Fig. 2 is a plan view, with the handles broken off. Fig. 3 is a plan of the under side of the cutter holder. Fig 4 is an edge view thereof and Fig. 5 shows one of the cutter securing pins. Fig. 6 is an enlarged view of a portion of the cutter holder showing how the cutters are held in the holder.

The numeral 1 designates the stock and 2 the handles thereon. The stock is formed with a base plate 3 and a vertical annular wall 4 in which I form a series of vertical slots 5 adapted to receive the ends of the cutters.

6 designates the cutter holder; this holder is cylindrical in form and fits loosely in the hollow stock, in inverted position. This holder is also formed with a series of vertical slots 7, cut about half way into the vertical wall, and adapted to register with the slots in the stock. In the walls of the slots 7, I form a series of rectangular depressions or grooves 8, those on one wall being located directly opposite those on the other wall.

The numeral 10 designates the cutters. These cutters are each formed with a series of vertical rectangular depressions or grooves 11 in each of two opposite faces, those on one side being arranged alternately with relation to those on the other side, so that one of the grooves on the cutter will always register with one of those in the holder, and a removable pin 12 is dropped into the rectangular opening formed by the two registering grooves, which serves to lock the cutter in that position. In order to adjust the cutters in the holder, the holder is removed from the stock and held with the grooved face down, when the pins will fall out, after which the cutters may be moved in or out until the desired pair of grooves is in register, when the pins are replaced. Each cutter is thus adjusted, and a scale 14 on the face of the holder in addition to an arrow head on the cutters will permit each cutter to be placed in the proper position, so that they will be uniform with relation to the body to be operated upon.

The holder is held in the stock by any suitable means as a set screw 15.

Having thus fully described my invention, what I claim and desire to secure by Letters Patent is:—

1. In a threading tool the combination of a stock having a vertical annular wall and a base plate formed with a central opening for the work, said wall having a series of vertical slots adapted to receive the cutters; a cutter holder of cylindrical form fitting within the stock, said holder having slots in one of its faces which register with the slots in the stock and in which the cutters are secured; a set of cutters adapted to be held in said slots in the holder and projecting through the slots in the stock; a series of rectangular depressions in the walls of the slots of the holder; a series of rectangular depressions formed in two opposite surfaces of the cutters, the depressions in one surface being arranged alternately with relation to those in the opposite surface and a series of rectangular pins adapted to enter the depressions when they register, whereby the cutters may be adjusted radially in the holder.

2. In a threading tool a hollow stock having an annular wall formed with vertical slots; an annular cutter holder fitting loosely in the stock, said holder having a series of slots registering with those in the stock and a series of vertical depressions in the faces of each slot; a set of cutters each of which is formed with depressions on two opposite surfaces, those on one side being arranged alternately with relation to those on the opposite side, and locking pins adapted to engage the cutters and the holder by entering the depressions when they register.

In testimony whereof I affix my signature in presence of two witnesses.

CHARLES B. BICKEL.

Witnesses:
Ed. A. Kelly,
Clara E. Young.